United States Patent [19]

Nihei et al.

[11] Patent Number: 5,055,731
[45] Date of Patent: Oct. 8, 1991

[54] HIGH-SPEED TWO-DIMENSIONAL ELECTROSTATIC ACTUATOR

[75] Inventors: Hideki Nihei, Hitachi; Nobuyoshi Tsuboi, Tokai; Hiroyuki Minemura, Hitachi; Hiroshi Kimura, Hitachi; Shigeki Morinaga, Hitachi, all of Japan

[73] Assignee: Hitachi, Ltd., Tokyo, Japan

[21] Appl. No.: 558,304

[22] Filed: Jul. 26, 1990

[30] Foreign Application Priority Data

Aug. 2, 1989 [JP] Japan .................................. 1-199407

[51] Int. Cl.⁵ ...................... H02N 1/00; H02K 41/02
[52] U.S. Cl. ...................................... 310/309; 310/12; 318/135; 361/233
[58] Field of Search ................. 310/12, 309; 318/135; 361/233; 367/181

[56] References Cited

U.S. PATENT DOCUMENTS

| | | | |
|---|---|---|---|
| 3,668,443 | 6/1972 | Schwartz | 310/12 |
| 3,851,196 | 11/1974 | Hinds | 310/12 |
| 4,754,185 | 6/1988 | Gabriel | 310/309 |
| 4,814,657 | 3/1989 | Yano et al. | 310/309 |

FOREIGN PATENT DOCUMENTS 283248  6/1988  Japan .................................. 310/309

Primary Examiner—Steven L. Stephan
Assistant Examiner—D. L. Rebsch
Attorney, Agent, or Firm—Antonelli, Terry, Stout & Kraus

[57] ABSTRACT

An electrostatic actuator includes a stationary element and a movable element. The stationary element has a surface which faces a surface of the moving element. Both the surface of the stationary element and the surface of the moving element have electrode lines disposed thereon, including a first set of parallel electrode lines and a second set of parallel electrode lines which are perpendicular to the lines in the first set. By facing the stationary surface and the movable surface towards each other such that the electrode lines of such surfaces are aligned, the movable element can be moved along either of two perpendicular axes when a voltage is applied to the electrode lines.

10 Claims, 10 Drawing Sheets

FIG. 8a ELECTROSTATIC CAPACITANCE
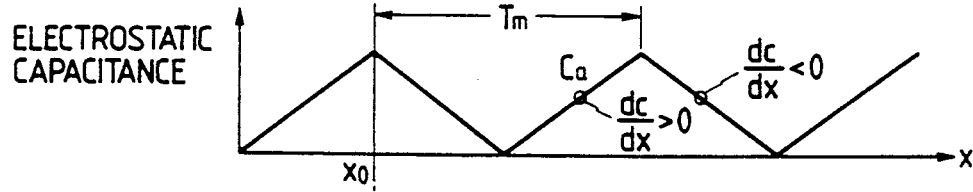
FIG. 8b
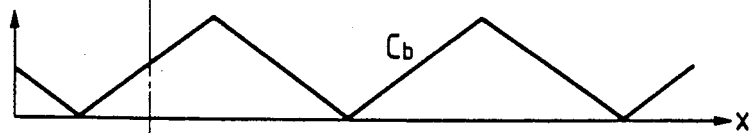
FIG. 8c
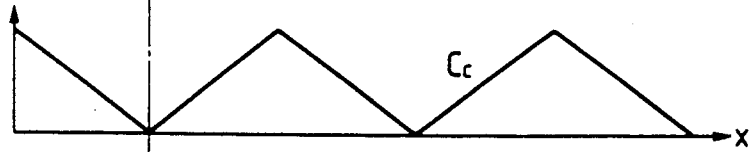
FIG. 8d
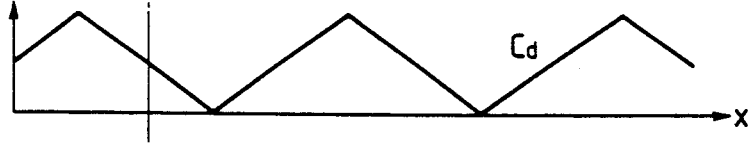
FIG. 8e APPLIED VOLTAGE
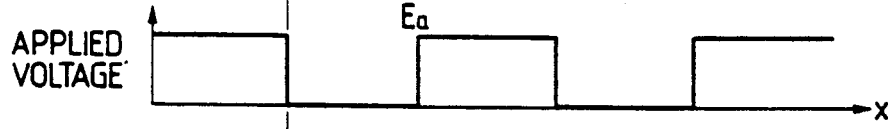
FIG. 8f
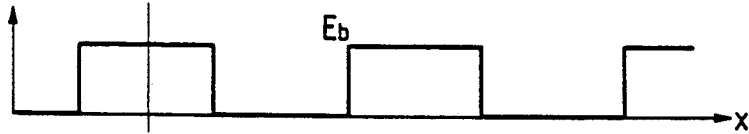
FIG. 8g
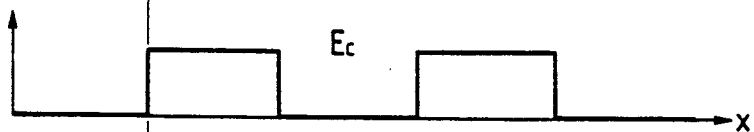
FIG. 8h
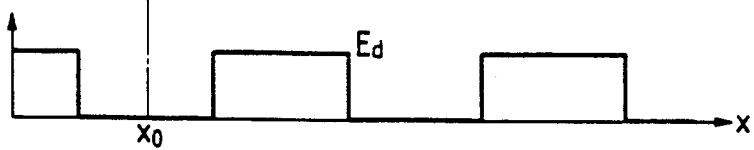

FIG. 9a PHASE A ELECTROSTATIC CAPACITANCE

FIG. 9e DETECTION SIGNAL

PHASE A
ELECTROSTATIC
CAPACITANCE

PHASE A
DRIVING SIGNAL

PHASE A
OFF SIGNAL

PHASE A
TERMINAL VOLTAGE

PHASE A
POSITION DETECTION
SIGNAL

PHASE C
ELECTROSTATIC
CAPACITANCE

PHASE C
POSITION DETECTION
SIGNAL

PHASE A
MODULATION SIGNAL

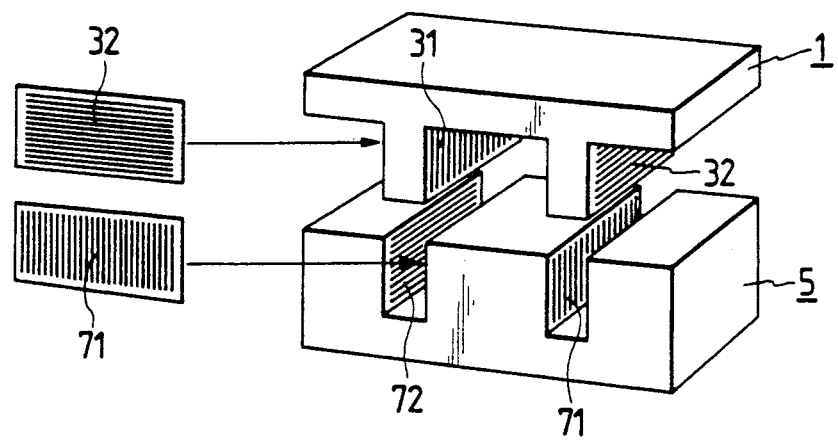
FIG. 11a
FIG. 11b
FIG. 11c
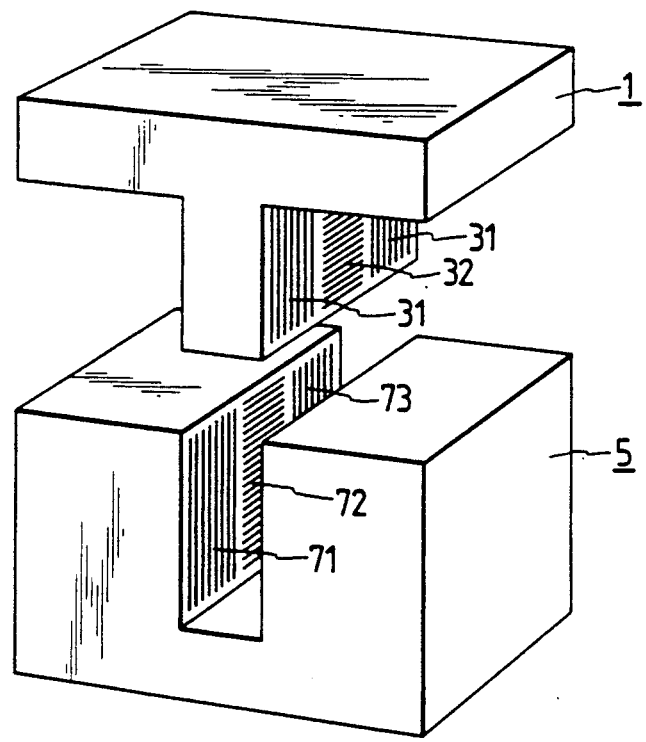
FIG. 12

HIGH-SPEED TWO-DIMENSIONAL ELECTROSTATIC ACTUATOR

FIELD OF THE INVENTION

This invention relates to an electrostatic actuator for moving a movable element in two-dimensional directions by use of electrostatic force and to an optical head and a magnetic head capable of responding at high speed using the actuator.

BACKGROUND OF THE INVENTION

As described in Japanese Laid-Open Patent Publication No. Sho 63-171173(1988), an electrostatic two-dimensional actuator has a metallic portion of a moving element which is separated from a stationary electrode by a predetermined distance in a predetermined direction. This will be explained with reference to FIGS. 1a to 3b. FIGS. 1a and 1b show a conventional movable element and FIGS. 2a and 2b show a conventional stationary element. In these drawings, 1a and 2a are sectional views and 1b and 2b are plan views. In the movable element 1 of FIGS. 1a and 1b, metallic plates 3a, 3b, 3c and 3d are buried at four positions into a plate 2 of an insulating material and a high dielectric thin film 4 is formed on the surface by sputtering, or the like. Four electrodes 7a, 7b, 7c and 7d shown in FIGS. 2a and 2b having the same area as the metallic plate 3 are formed by bonding or the like on the surface of the insulating material 6 of the stationary element so that when the stationary element is superposed with the movable element of FIGS. 1a and 1b, the electrodes are spaced apart in a predetermined direction and by a predetermined distance from the metal.

FIG. 3a is a sectional side view of the actuator constituted by superposing the movable element and stationary element shown in FIGS. 1a and 1b and 2a and 2b and FIG. 3b is a sectional view from its top. Here, when a voltage is applied to the electrode 7a of the stationary element, the metal 3a is attracted by the charge of the electrode 7a and the movable element 1 moves to the right in the drawing until the electrode 7a and the metal 3a completely overlap one another. When the voltage application is switched to the electrode 7b, the movable element likewise moves leftwardly downward in the drawing until the metal 3b overlaps the electrode 7b. In this manner, the conventional example variously changes the moving direction of the movable element by selecting a suitable sequence of voltage application to a plurality of electrodes and its magnitude to execute rough movements and fine movements.

The prior art described above involves the following problems. The first problem is that it does not particularly consider the metallic gap between the electrode dimension of the stationary element and the dimension of the metallic portion of the movable element between the electrodes, for if the metallic portion of the movable element deviates from the electrode of the opposed stationary element, it does not operate. Second, since the centroid of the movable element and the generation portion of the propelling force are not in conformity with each other, there can occur a case where a rotational force acts on the movable element. Also, in such a case, if the position relation between the movable element and the stationary element deviates to a great extent, the drop of the propelling force cannot be started. Third, the movement in one direction is made by the combination of one electrode of the stationary element and one metallic portion of the movable element. Accordingly, the movement can be made only inside the areas of the electrode and the metallic portion but cannot be made in a long distance.

SUMMARY OF THE INVENTION

It is an object of the present invention to provide an electrostatic two-dimensional actuator which can move at a high speed, stably and two-dimensionally.

It is another object of the present invention to provide an application system capable of high speed response such as an optical head or a magnetic head.

In order to accomplish the objects described above, the electrostatic two-dimensional actuator of the present invention includes a movable element and a stationary element which oppose each other on at least one surface, and is characterized in that a plurality of rectangular first electrode lines disposed spatially in parallel and a plurality of rectangular second electrode lines disposed in such a manner so as to cross substantially orthogonally and spatially the first electrode lines are disposed on the opposed surfaces of the movable element and stationary element, respectively.

Furthermore, the present invention includes a movable element and a stationary element which oppose each other on at least one surface and means for generating first and second propelling forces occurring independently by electrostatic force on the opposed surfaces of the movable element stationary element, respectively, and wherein the first propelling force and the second propelling force described above have the directions of propelling forces that cross substantially orthogonally spatially. Further, the present invention includes a movable element and a stationary element, having a construction wherein the movable element moves two-dimensionally by the electrostatic force and the response frequency is at least 20 KH2 when the moving displacement of the movable element is 0.1 μm.

Still further, the present invention is characterized in that the centroid of the movable element and the generation portion of the propelling force are in conformity with each other.

Still further, the present invention is characterized in that a first operation entailing the application of the voltage to the first electrode line or to the second electrode line for generating the propelling force. A second operation entailing and the detection of the change of the electrostatic capacitance for detecting the position of the movable element are carried out in such a manner that the second operation is carried out during the period in which the first operation is not carried out.

Still further, the present invention is characterized in that the voltage to be applied to either the first electrode line or the second electrode line on the stationary element is divided into three or more phases, a voltage supply line is provided to each phase, and the voltage to be applied to the voltage supply line is sequentially switched so as to move the movable element.

The present invention also is characterized in that the timing of the application of voltage to each voltage supply line and the cut-off timing of the voltage are judged from the change of the electrostatic capacitance appearing on the voltage supply line of each phase.

Furthermore, the present invention is characterized in that when the electrode pitch of the first electrode line and second electrode line on the movable element is Tm, the electrode pitch of the first electrode line and second electrode line on the stationary element is Ts and the voltage is a voltage having an n phase, the following relationship is achieved:

$$Ts = (1 \pm 1/n) \times Tm$$

Furthermore, the present invention is characterized in that the dimension of the first and second electrode lines in the longitudinal direction is different between the movable element and the stationary element In order to accomplish the other object of the present invention, the present invention is characterized in that an optical integrated circuit is formed on the electrostatic two-dimensional actuator so as to constitute an optical head.

Furthermore, the present invention is characterized by constituting an optical disk apparatus by including the optical head described above and rotation means for the optical disk which is irradiated from the optical head.

The present invention is also characterized in that magnetic detection means is formed on the movable element of the electrostatic two-dimensional actuator described above to constitute a magnetic head. A magnetic tape apparatus can be obtained by providing this magnetic head and driving means for a magnetic tape which is magnetically detected by the magnetic head.

To repeat once again, in order to accomplish the objects described above, the present invention employs the construction wherein the first and second rectangular electrode lines are disposed on the surface of the movable element and stationary element, respectively, the surfaces of the movable element and stationary element on which the electrode lines are disposed face each other through a gap, and the rectangular electrode lines are disposed on the movable element and the stationary element so that when the first and second electrode lines are projected on the plane parallel to the surface of the movable element or stationary element on which the electrode lines are disposed, the first and second rectangular electrode lines appear mutually in the vertical direction.

Definitely, the present invention provides a electrostatic two-dimensional actuator which has the construction wherein the width Wm of the first and second rectangular electrodes in the direction of disposition and the electrode gaps Sm is at a ratio of 1:1 or the electrode gap Sm is greater; the sum of Wm and Sm is the electrode pitch Tm; the first and second rectangular electrode lines of the stationary element are sequentially divided into n phases; the width Ss of the first and second rectangular electrodes of the stationary element in the direction of disposition and the electrode pitch Ts are set so as to satisfy the formulas Ws = Wm and $$Ts = \left(1 \pm \frac{1}{n}\right) \times Tm;$$

means as voltage application means for sequentially applying and cutting off the voltage to the first and second rectangular electrode lines of the stationary element for each phase is disposed; and means for detecting the change of the electrostatic capacitance of the phase, to which the voltage of the first and second rectangular electrode lines of the stationary element is not disposed, is disposed.

The movable element and the stationary element do not have an absolute difference, and in the construction described above, a similar electrostatic two-dimensional actuator can be accomplished by fixing the movable element side and moving the stationary element.

In order to accomplish other objects of the present invention can, the present invention provide an optical head or magnetic head equipped with the electrostatic two-dimensional actuator described above.

When the voltage is applied to the first rectangular electrode line of the stationary element, the electrostatic attraction force is generated between it and the corresponding first rectangular electrode line of the movable element and the movable element moves in the direction of the disposition of the first and second rectangular electrode lines. Similarly, when the voltage is applied to the second rectangular electrode line of the stationary element, the electrostatic attraction force occurs between it and the corresponding second rectangular electrode line of the movable element, and the movable element moves in the direction of disposition of the first and second rectangular electrode lines. Further, since the first electrode line and the second electrode line are disposed in the mutually crossing direction, the moving direction due to the first electrode line and the moving direction due to the second electrode line cross each other, and by combining the movement by the first and second electrode lines, the movable element can eventually move two-dimensionally.

The dimension of the disposition of the electrodes is such that while the first and second electrode lines of the stationary element are divided into n phases, if the electrode of one phase is completely in conformity with the electrode of the movable element, one of the other phases overlaps with the electrode of the movable element by only the 1/n width from this electrode in the moving direction and one more phase of the other phases overlaps with the electrode of the movable element by the 1/n width in the direction of the preceding phase on the opposite side so that the electrostatic attraction force always occurs uniformly without interruption and the stable movement of the movable element can always be accomplished.

The phase of the first and second rectangular electrode lines of the stationary element to which the voltage is to be applied is determined by applying the voltage to the phase whose electrostatic capacitance becomes minimum and whose electrostatic capacitance change starts increasing at the timing of the increase since the change of the electrostatic capacitance of the phases to which the voltage of the electrode lines of the stationary element is not applied can be detected, and the voltage of the phase to which the voltage has been applied is cut off at that timing. In this manner the displacement in one phase becomes maximum, and since the application and cut-off of the voltage are conducted under the same condition of the position relation between the electrode of the multiphase stationary element and the electrodes of the movable element, a movement of the slidable element which is always stable can be accomplished.

An extremely compact optical head or magnetic head can be obtained by applying the electrostatic two-dimensional actuator of the present invention to an optical head, or to a magnetic head and therefore a tracking operation and a focusing operation, each having a higher speed, can be accomplished.

The above and other features of the present invention will become more apparent from the following description.

BRIEF DESCRIPTION OF THE DRAWINGS

FIGS. 8 to 10 are diagrams showing the electrostatic capacitance and voltage waveforms at each portion of FIG. 7; and FIGS. 11 to 16 are appearance views of other embodiments of the present invention.

DETAILED DESCRIPTION OF THE PREFERRED EMBODIMENTS

Figure 4:
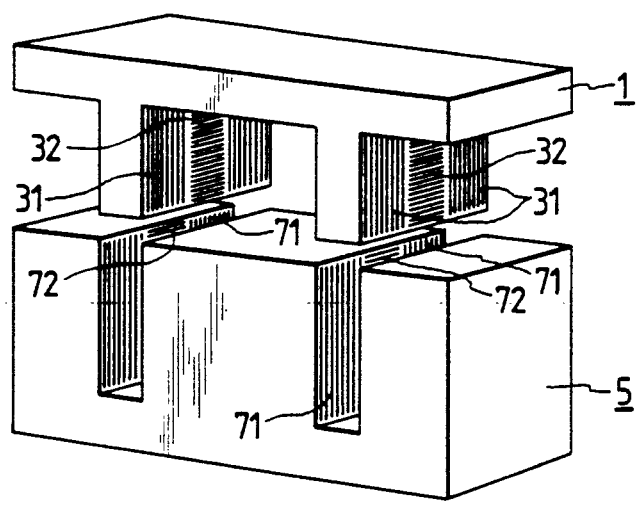
FIG. 4 is an appearance view of one embodiment of the present invention.

The first embodiment of the present invention will be explained with reference to FIG. 4 and FIGS. 5 to 9. FIG. 4 is an exploded appearance view of the electrostatic two-dimensional actuator of the present invention. The electrostatic two-dimensional actuator consists of a movable element 1 and a stationary element 5. A first rectangular electrode line 31 and a second rectangular electrode line 32 that cross one another at right angles are disposed on both surfaces of protuberances of the movable element 1 made of a dielectric, though only one of each side can be seen in the drawing. A first rectangular electrode line 71 and a second rectangular electrode line 72 that cross one another at right angles are disposed on both surfaces of recesses of the stationary element 5, which is made of a dielectric, though only one of each side can be seen in the drawing. The electrode lines are disposed on both surfaces of the tooth portions of the $\pi$-shaped movable element 1, or they may be disposed on only one side surface whenever necessary. The $\pi$-shape is also called a "chopping-board like" shape. In the drawing, the movable element exists in the space above the stationary, element but when it operates as the electrostatic two-dimensional actuator, the protuberances of the movable element enter the recesses of the stationary element.

Accordingly, in this embodiment, the recess itself that forms the electrode disposition surface of the stationary element can play the role as a guide mechanism of the movable element.

Figure 5A:
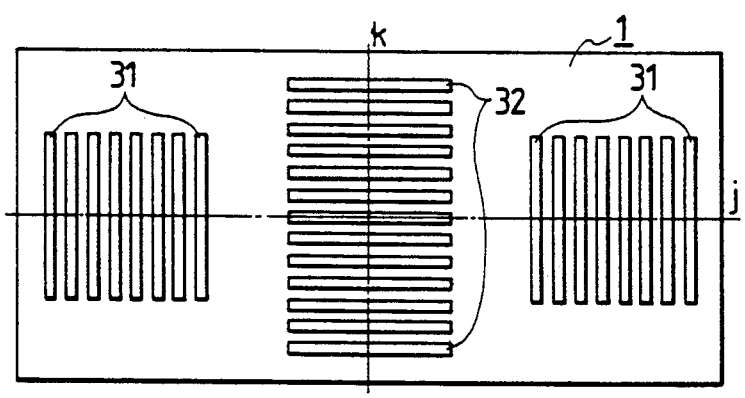
FIG. 5a a plane view of an electrode pattern of the movable element, and 5b that of the stationary pattern of the stationary element shown in FIG. 4.
Figure 5B:
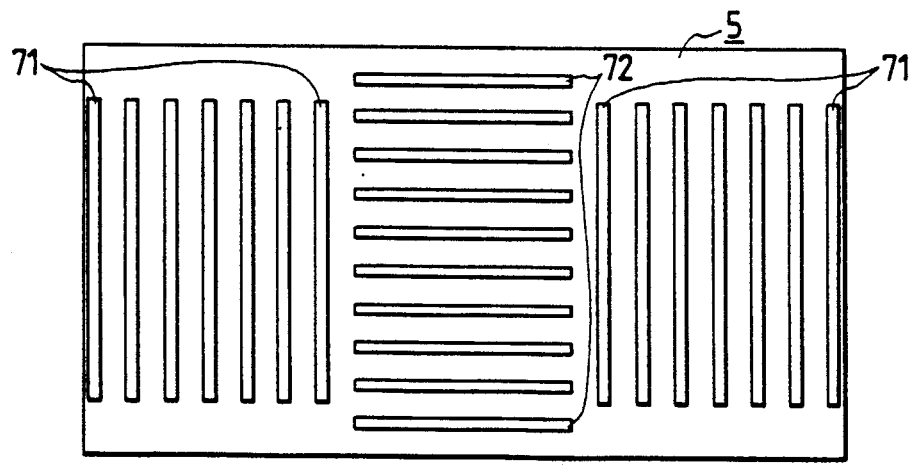

FIG. 5 is a disposition diagram (a) of the electrode line on the electrode disposition surface of the movable element 1 of this embodiment and the disposition diagram (b) of the electrode line on the electrode disposition surface of the stationary element 5. The first rectangular electrode arrangement 31 and the second rectangular electrode arrangement 32 crossing the former at right angles are disposed on the electrode disposition surface of the movable element 1. The first rectangular electrode arrangement 71 is disposed on the electrode disposition surface of the stationary element 5 corresponding to the first rectangular electrode arrangement 31 of the movable element 1, and the second rectangular electrode arrangement 72 is disposed on the electrode disposition surface of the stationary element 5 corresponding to the second rectangular electrode arrangement 32 of the movable element 1.

The electrodes are linearly symmetric with one another with respect to one center line j of the movable element and to another k in the drawing, and the point of occurrence of a propelling force exists on the center lines. Therefore, unbalance of the propelling force does not occur, and stable movement can be made.

Each electrode arrangement 31, 32 of the movable element 1 and each electrode arrangement 71, 72 of the stationary element 5 have different electrode pitches T and a different electrode length l in a longitudinal direction of the electrode. The effect due to the difference of the dimension of the electrodes and the operation principle as the electrostatic two-dimensional actuator will be explained with reference to FIG. 6.

Figure 1A:
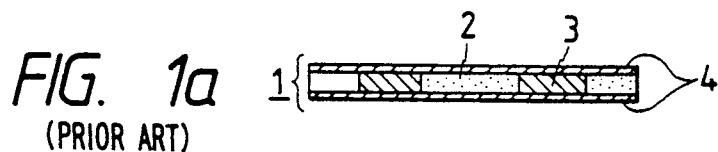
FIGS. 1a to 3b are sectional and plane views of conventional movable element, stationary element and electrostatic two-dimensional actuator, respectively.
Figure 1B:
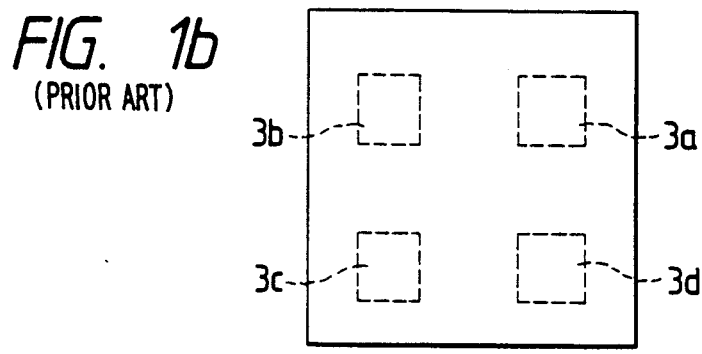
Figure 2A:
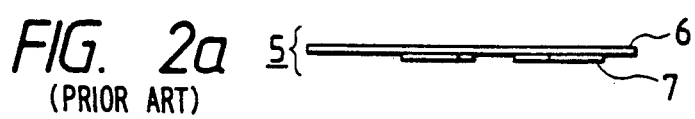
Figure 2B:
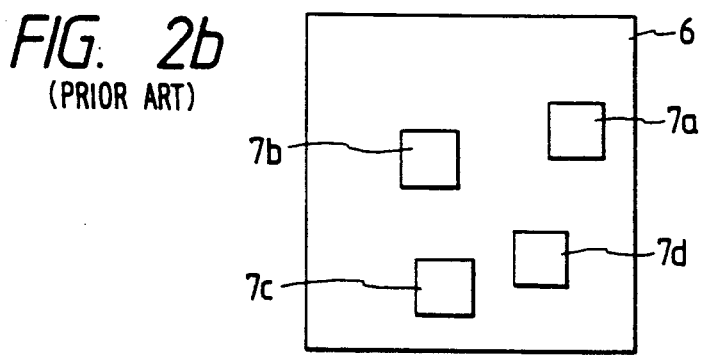
Figure 3A:
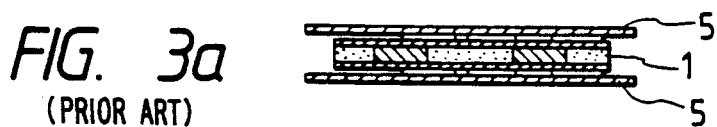
Figure 3B:
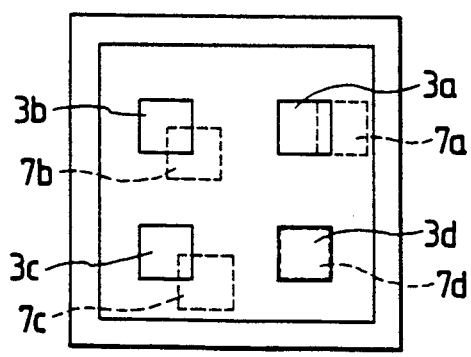
Figure 6A:
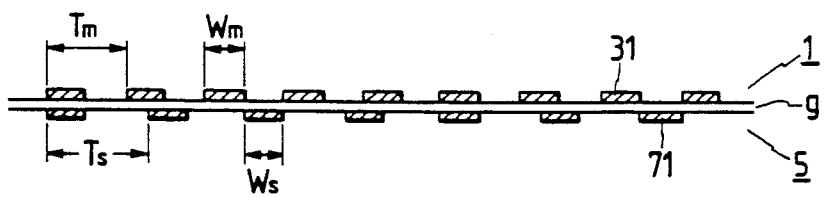
FIG. 6b is a planar perspective view, and 6a a sectional view of the opposed portions of the stationary element and movable element shown in FIG. 4.

FIG. 6 is a sectional view (a) of the opposed portions of the electrode disposition surface of the movable element 1 and that of the stationary element 5 shown in FIG. 1 and its planar perspective view (b). Though the arrangements 31 and 71 of the first electrode will be explained in this drawing, the second electrode arrangements 32 and 72 have the same construction and the principle of movement in the same way as in the following description.

The movable element 1 and the stationary element 5 face each other through a gap g by a support/guide mechanism not shown in the drawing. When a coating film made of an insulating material or a dielectric is applied to the surfaces of the stationary element 5 and movable element 1, the gap g contains its film thickness. The arrangement 31a of the first rectangular electrodes of the movable element 1, the width Wm of each electrode and the electrode pitch Tm have the relation expressed below:

$$Tm \geq 2\ Wm \ldots \tag{1}$$

The width Ws of each electrode of the first electrode arrangement 71 of the stationary element 5 and its electrode pitch have the following relation:

$$Ws = Wm \ldots \tag{2}$$

$$Ts = 1.25 \times Tm \ldots \tag{3}$$

In this embodiment the number n of phases of the electrode is 4 and the four phases A, B, C and D are disposed sequentially in the first electrode arrangement 71 of the stationary element 5. Further, a voltage supply line 8 is connected to each phase of the first electrode arrangement 71 of the stationary element 5. A ground line 9 is connected to the electrode line of the movable element 1. The lengths ls and lm of the rectangular electrodes of the stationary element 5 and movable element 1 in the longitudinal direction of the electrode have the following relation:

$$l_s = \Delta l_1 + \Delta l_2 + lm \ldots \tag{4}$$

When the movable element 1 and the stationary element 5 have the position relation shown in FIG. 6, since the electrode pitch Ts of the stationary element 5 is 1.25 times the electrode pitch Tm of the movable element 1, the electrode 31 of the movable element and the electrode 71 of the stationary electrode overlap completely in the A phase, the movable element electrode 31 and the stationary element electrode overlap by only the ½ area in the B phase, the movable elements electrode 31 and the stationary element electrode overlap by only the ½ area in the D phase in the opposite direction to the case of the B phase, and the movable element electrode 31 and the stationary element electrode 71 do not at all overlap in the C phase. Accordingly, when the voltage is applied to the B phase electrode of the stationary element 5, electrostatic attraction force occurs between the B phase electrode and the electrode of the movable element 1, and the movable element 1 moves to the right in the drawing until the B phase electrode of the stationary element 5 overlaps the electrode of the movable element 1. At this time, since the C phase electrode of the stationary element 5 has the position relation with the electrode of the movable element 1 in the same way as the B phase electrode shown in the drawing, the movable element 1 moves to the right if the voltage is applied to the C phase electrode of the stationary element 5. In this manner, the movable element moves to the right in the drawing by applying sequentially the voltage to the electrode of each phase of the stationary element 5 in the sequence of B→C→D→A→B . . . , and so forth. When the voltage is applied to the electrode of each phase of the stationary element 5 in the sequence of D→C→B→A, the movable element moves smoothly to the left in the drawing.

The reason why the pitch Ts of the electrode of the stationary element 5 is set to be 1.25 times the electrode, pitch Tm of the movable element 1 will be explained next. Since the electrodes of the stationary element 5 have the four phases, if the phase difference of each phase as the electrical angle if set to be ¼ of 360°, that is, 90°, an equal phase difference can be obtained. The electrode pitch Ts of the stationary element 5 may deviate by ¼ of the electrode pitch Tm of the movable element 1. In order to obtain the electrode pitch Ts of the stationary element 5 which deviates by ¼ with respect to the electrode pitch Tm of the movable element 1, Ts is set to be 1.25 times Tm in this embodiment.

In this embodiment, the electrode pitch Ts of the stationary element 5 is set to be greater than the electrode pitch Tm of the movable element 1 but since the apparatus operates as the electrostatic actuator if the pitch deviates by ¼, Ts may be smaller than Tm, that is, Ts = 0.75 × Tm.

When an electrostatic actuator having an n-phase is considered generally, the electrode pitch Ts of the stationary element and the electrode pitch Tm of the movable element may deviate by the value obtained by dividing Tm by the phase number n and may satisfy the following relation:

$$Ts = \left(1 \pm \frac{1}{n}\right) \times Tm \quad (4)$$

The electrostatic two-dimensional actuator of this embodiment can move in one direction by employing the construction of the first electrode line 71 of the stationary element 5 and the first electrode line 31 of the movable element 1 described above, and by application means for sequentially applying the voltage of the electrode line of the stationary element 5 for each phase. Further, the second electrode line 72 of the stationary element 5 and the second electrode line 32 of the movable element 1 have the same construction as the first electrode line and if the similar voltage application means as used for the first electrode line is used, the electrostatic two-dimensional actuator can move in a direction orthogonal to the moving direction by the first electrode line.

Accordingly, an electrostatic two-dimensional actuator capable of moving two-dimensionally can be obtained by combining the movements by the first and second electrode lines.

Figure 6B:
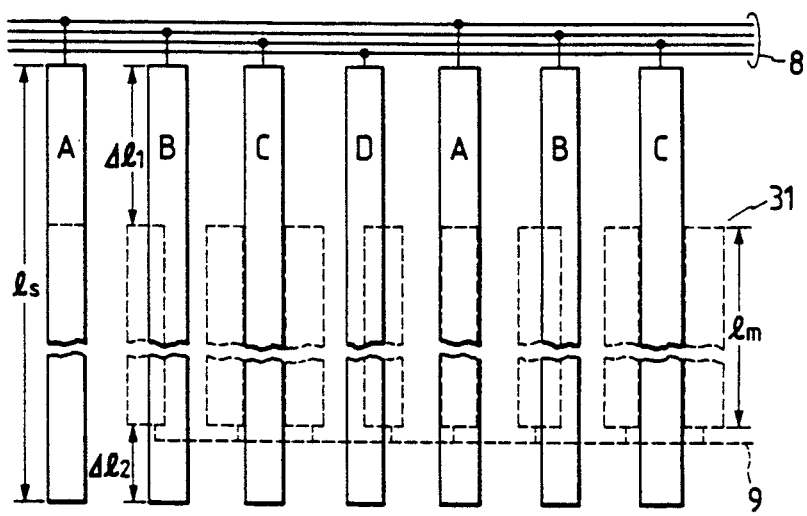

In FIG. 6(b), there is the difference $\Delta l_1 + \Delta l_2$ between the first electrode length ls of the stationary element 5 and the second electrode length lm of the movable element 1. Therefore, even when the movable element 1 moves in the longitudinal direction of the first electrode line due to the second electrode line, the overlap area between the first electrode line 71 of the stationary element 5 and the first electrode line 31 of the movable element 1 does not change within the range of $\Delta l_1 + \Delta l_2$. Therefore, the first electrode line is not affected by the movement of the movable element due to the second electrode line within this range $\Delta l_1 + \Delta l_2$ and can generate predetermined propelling force. In the second electrode line, too, the difference $\Delta l$ is provided in the electrode length in the longitudinal direction between the stationary element 5 and the movable element 1 and predetermined propelling force can be generated by the second electrode line without being affected by the movement of the movable element during $\Delta l$.

Figure 7:
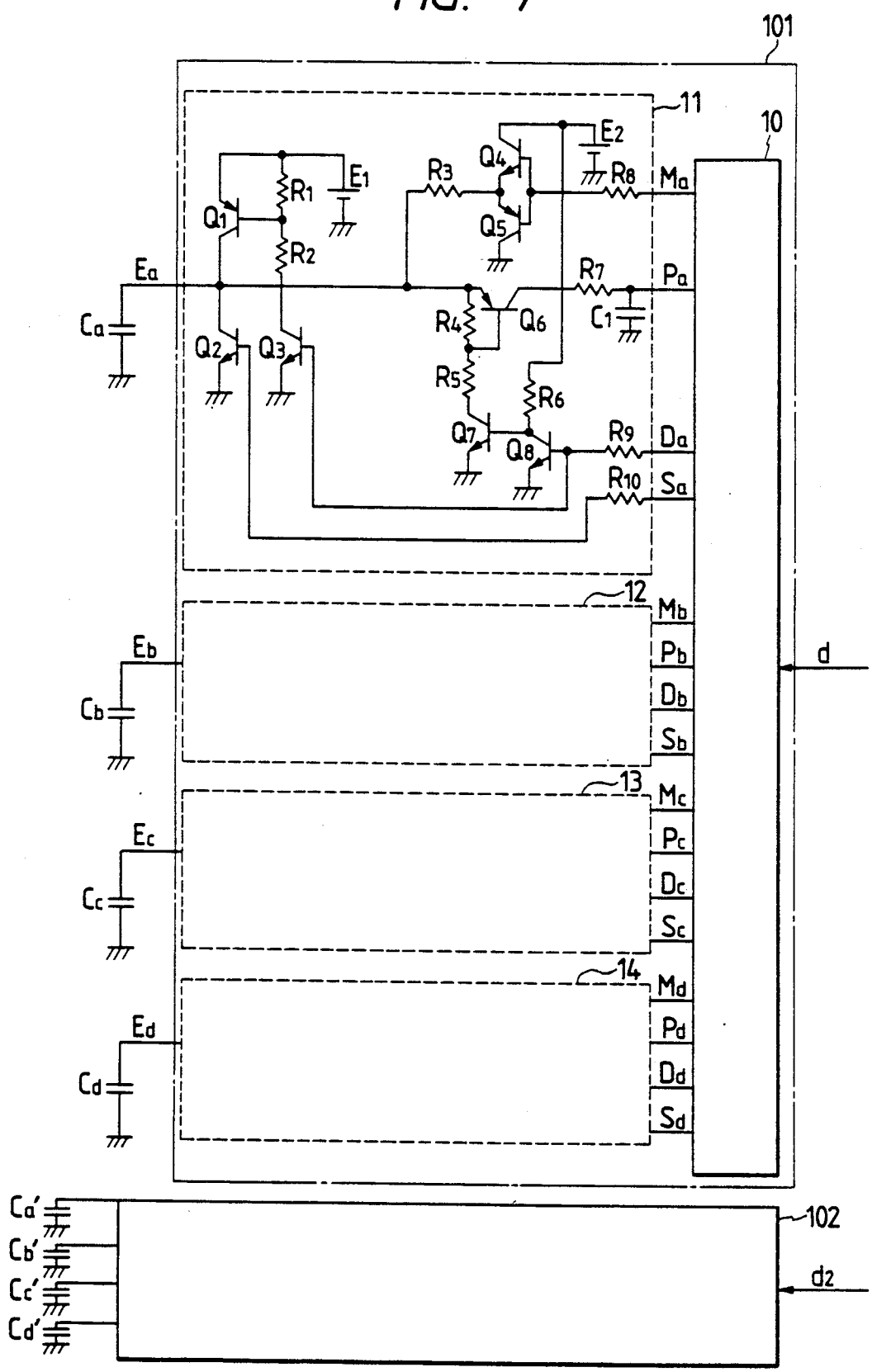
FIG. 7 is a control circuit diagram for driving the electrostatic two-dimensional actuator of FIG. 4.
Figure 9B:
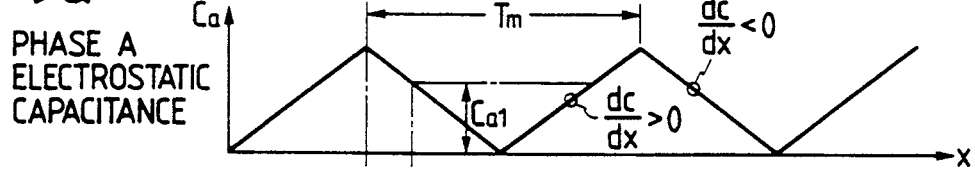
Figure 9B:
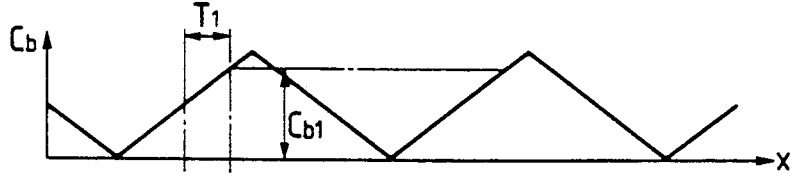
Figure 9C:
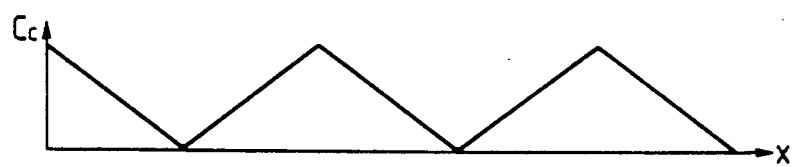
Figure 9D:
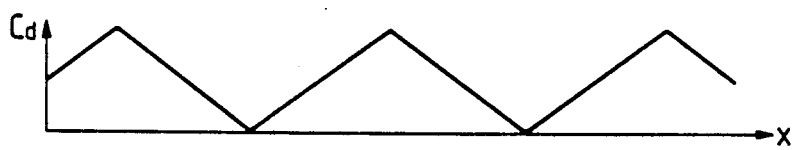
Figure 9F:
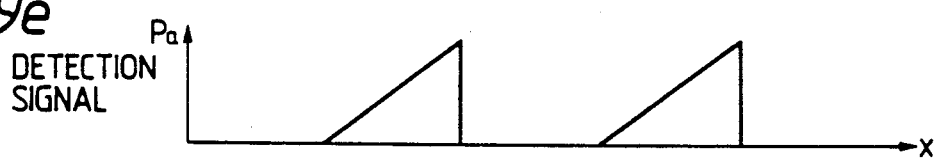
Figure 9F:
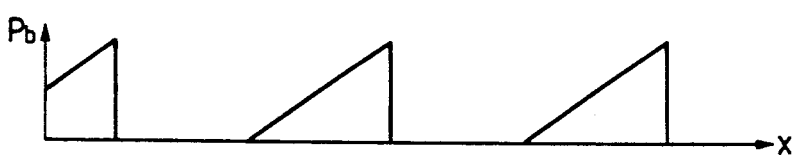
Figure 9G:
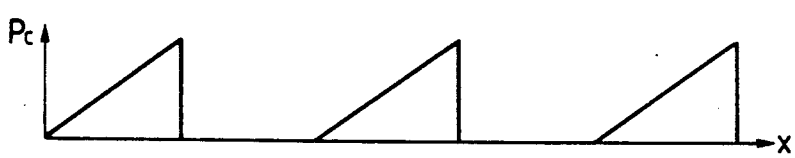
Figure 9H:
Figure 10A:
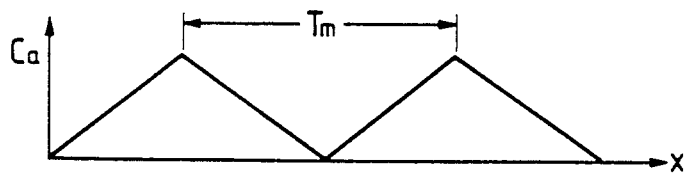
Figure 10B:
Figure 10C:
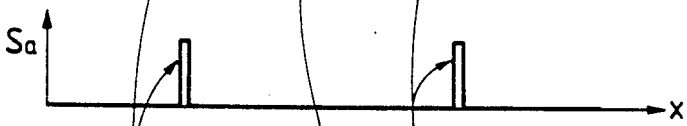
Figure 10D:
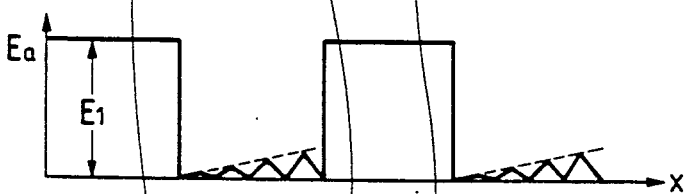
Figure 10E:
Figure 10F:
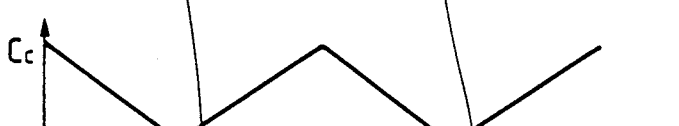
Figure 10G:
Figure 10H:
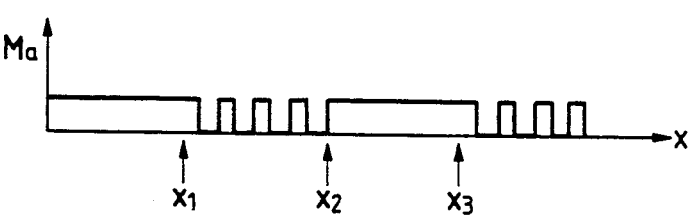

Next, the control method of this embodiment will be explained. FIG. 7 shows the control circuit of this embodiment. FIGS. 8 to 10 show the change of the electrostatic capacitance and voltage to the movable element position at each portion of this embodiment.

In FIG. 7, $C_a$, $C_b$, $C_c$ and $C_d$ represent the electrostatic capacitance of the first A, B, C and D phases of each stationary element. Reference numeral 10 represents a controller circuit; 11, 12, 13 and 14 are drive-sensing circuits of the A, B, C and D phases, respectively; and 101 is a circuit portion for controlling the first electrode line.

Similarly, a control circuit portion 102 is disposed for the second electrode line, too, and has the similar construction for the electrostatic capacitance $C_a'$, $C_b'$, $C_c'$ $C_d'$ of each of the A, B, C and D phases. Hereinafter, the first electrode line will be particularly explained.

The electrostatic capacitance $C_a$ of the A phase electrode changes substantially proportionally to the overlap area between the A phase electrode and the movable element electrode in such a manner that the electrostatic capacitance $C_a$ becomes maximum when the A phase electrode and the movable element electrode overlap completely and becomes minimum when the A phase electrode and the movable element electrode do not at all overlap. The electrostatic capacitance of the electrode of each phase of the stationary element can be expressed as follows assuming that the gap length between the electrodes is extremely short with respect to the electrode width (W > g in FIG. 6):

$$C = \frac{\epsilon S}{g} \cdot m \quad (5)$$

Here, $\epsilon$ is the dielectric constant of the gap, S is the overlap area of the electrodes of each phase and m is the number of electrodes of each phase.

The overlap area S of the electrode of the formula (5) becomes a triangular wave using the electrode pitch Tm of the movable element as the period with respect to the position of the movable element. Therefore, the electrostatic capacitance C, too, of each phase becomes a triangular wave using Tm as one period.

Here, the propelling force generation mechanism of this embodiment will be again examined in detail. Let's consider the case where the movable element is at the position xo in FIG. 8 and is to be moved in the x direction. If the voltage E is applied when the electrostatic capacitance C changes at the movable element position x, the force F occurring in the x direction between the electrodes which generate the electrostatic capacitance change is expressed as follows:

$$F = \frac{1}{2} E^2 \frac{dc}{dx} \qquad (6)$$

Therefore, dc/dx is positive at the point xo. When the voltage is applied to each of the B and C phases, the positive propelling force, that is, the force that moves the movable element in the x direction, occurs. Therefore, the propelling force occurs without interruption by applying sequentially the voltage to the phases that have the relation dc/dx >0 and the movable element moves in the x direction.

If the voltage is applied to the phase having the relation dc/dx<0, on the contrary, the propelling force becomes negative and the movable element moves in the -x direction.

Next, the method of applying the voltage to the electrode of each phase and judging the cut-off timing in this embodiment will be explained with reference to FIG. 9. FIG. 9 shows the change of the electrostatic capacitance C of the electrode of each phase with respect to the movable element position and the change of the position detection signal P of each phase with respect to the movable element position. The A phase represents Ca and Pa, the B phase does Cb and Pb, the C phase does Cc and Pc and the D phase does Cd and Pd.

The position detection signal P can be obtained by applying a high frequency voltage to the electrode of the phase, to which the voltage is not applied, through a resistor, and removing the high frequency component from the output voltage of that electrode portion through a low-pass filter. When the electrostatic capacitance C is great, the time constant becomes great, so that the output voltage is small and the output voltage rises with the decrease of the electrostatic capacitance C. Accordingly, the position detection signal P becomes a triangular wave having a peak at the point where the electrostatic capacitance C becomes minimum. However, since the position detection signal P cannot be obtained during the period in which the voltage is applied to the electrode of each phase in order to move the movable element, it becomes an intermittent triangular wave such as shown in FIG. 9.

In this embodiment, the voltage is sequentially applied for driving to the electrodes of the four phases as shown in FIG. 8. In consideration of the position detection signal P shown in FIG. 9 and the phase relation of the applied voltage of FIG. 8, the voltage application timing is set to the timing at which the position detection of the phase itself, to which the voltage is applied, attains the peak and the voltage cut-off timing is set to the timing at which the position detection signal of the phase which deviates by two phases (the position detection signal of the C phase when the voltage of the A phase is cut off) attains the peak.

If such a position detection/voltage application method is employed, the voltage application/cut-off timing to the electrode of each phase can be controlled reliably.

Finally, the definite operation of the control circuit in this embodiment will be explained on the basis of FIG. 7 with reference to the waveforms shown in FIG. 10. A system controller 10 outputs a modulation signal M, a driving signal D and an OFF signal S to each phase in response to the command $d_1$ to the first electrode line among the movement command of the electrostatic two-dimensional actuator from a higher order apparatus and receives the position detection signal P. As to the phase A, the modulation signal Ma, the driving signal Da, the OFF signal Sa and the position detection signal Pa have the relation such as shown in FIG. 10. In FIG. 7, reference numerals 11, 12, 13, 14 represent drive circuits of the A, B, C and D phases, respectively. They have the same construction.

Symbol $d_2$ and reference numeral 102 represent the command to the second electrode line and the system controller (with a built-in drive circuit) of the second electrode line, respectively.

Let's assume that the movable element of the electrostatic two-dimensional actuator is under the state where it has passed the position xl in the moving direction x of the first electrode line (between $x_1$ and $x_2$). The definite operation for judging the timing of application of the voltage to the A phase under this state will be explained. Since the drive signal Da is L (under the state of the ground potential), the transistor Q3 of the drive circuit 11 of the A phase is OFF. Accordingly, the transistor Q1 is OFF and the driving voltage El is not applied to the A phase electrode.

On the other hand, the A phase modulation signal Ma repeats periodically the two state L and H (the power source voltage E2). When Ma is H, Q4 is ON and Q5 is OFF and a current flows from the power source voltage E2 to the electrostatic capacitance $C_a$ of the A phase electrode through a resistor R3. Accordingly, the terminal voltage Ea of the A phase rises with a time constant of Ca·R3. When Ma is L, Q5 is ON and Q4 is OFF and the charge that has been charged to the A phase electrode is discharged through the resistor R3. Accordingly, the terminal voltage Ea of the A phase falls with a time constant Ca·R3. The electrostatic capacitance $C_a$ of the A phase drops with the movement of the movable element in the x direction of the electrostatic two-dimensional actuator (the moving direction of the movable element by the first electrode line) and the peak of the terminal voltage Ea of the A phase increases.

Now, since the A phase driving signal Da is L, the transistor Q8 is OFF and Q7 is ON. The transistor Q6 is ON, too, and the A phase position detection signal Pa obtained through the low-pass filter of R7·C1 increases linearly.

Accordingly, at the point at which this A phase position detection signal Pa exceeds a certain level Pt, judgment is made that the driving voltage application position x2 at which the electrostatic capacitance of the A phase becomes minimum is reached, and the A phase modulation signal Ma is kept H as such but the A phase driving signal Da is changed to H. Accordingly, while the transistor Q4 is ON but Q5 is OFF, the power source voltage E2 is kept applied to the A phase. On the other hand, the transistor Q8 is ON, Q7 is OFF and hence Q6 is ON. Therefore, the A phase position detection signal Pa changes to L. Since the transistor Q3 is ON, Q1 is ON, too, the power source voltage El is applied to the A phase electrode and the propelling force due to electrostatic attraction force occurs. Since the power source voltage El is by far greater than E2, it is principally El that contributes as the driving force.

Next, the definite operation for judging the time at which the A phase driving voltage El is cut off will be explained. Now, since the phase of the C phase deviates by ½ Tm from that of the A phase, the position detection signal Pc of the C phase occurs as shown in FIG. 10. Therefore, when the C phase position detection signal reaches a certain level Pt, judgment is made so that the electrostatic capacitance of the A phase is maximum and the driving voltage cutoff position x3 of the A phase is reached, and the phase driving signal Da changes to L. Accordingly, the transistors Q3 and Q4 are OFF and the power source voltage El applied to the A phase is cut off. At the same time, the A phase OFF signal Sa changes to H and the transistor Q2 is turned ON. Accordingly, the A phase electrode is under the short-circuit state and the charge that has been charged between the electrodes of the A phase is discharged. As a result, the voltage of the A phase electrode becomes instantaneously zero as shown in FIG. 6.

Thereafter, the A phase modulation signal Ma again repeats L and H to generate the A phase position detection signal, waits for the driving voltage application timing of the A phase and thereafter repeats the same operation as described above.

The electrostatic capacity does not change at the time of stop. Therefore, at the time of start, the position detection is not made but the driving voltage is applied to the specific phase and the phase to which the driving voltage is applied is sequentially switched so that the movement is made in a predetermined period, a predetermined number of times and in a predetermined direction. Thereafter, the position detection operation is made.

As described above, the definite operation has been explained with respect to the movement in the direction of the arrangement of the first electrodes in this embodiment. However, the movement in the direction of the arrangement of the second embodiment, too, can be accomplished by effecting the same operation as the operation applied to the first electrode arrangement.

According to this embodiment, the electrostatic two-dimensional actuator for smoothly moving the movable element in the mutually crossing two directions in a long range can be accomplished by disposing the mutually crossing first and second electrode arrangements on the stationary element and on the movable element and selecting the electrode pitch Ts on the stationary element side so as to be Ts = 1.25 Tm. The device for position detection is not particularly required by use of the construction wherein the position detection and the generation of the driving force are made by the same electrode and a compact electrostatic two-dimensional actuator can therefore be accomplished. Further, the propelling force to be generated can be increased by increasing the number of electrodes for each phase. Particularly, the actuator can be made extremely compact and moved at a high speed by miniaturizing the electrode shape and forming the electrode width and the gap length in the order of μm or sub-μm order by application of recent ultra-LSI fabrication technique, and an electrostatic two-dimensional actuator can thus be accomplished.

In one embodiment of the present invention, the application of the driving voltage and its cut-off are judged from the peak value of the position detection signal P. As another embodiment, there is means which handles the position detection signal P as an analog quantity and utilizes the amplitude of the position detection signal P as position information. If this system is used, the position of the movable element can be judged within an electrical angle of 360° even at the time of stop. At this time, the necessary information is only the position detection signals of two phases which are deviated from each other by 90° in terms of the electrical angle. If the A phase electrostatic capacitance Ca and the B phase electrostatic capacitance Cb shown in FIG. 9 are considered (since the position detection signal P corresponds to the electrostatic capacitance on the 1:1 basis, it is converted to the electrostatic capacitance), for example, it is possible to judge that the position of the movable element is at the position T1 within the range of 360° in terms of the electrical angle, that is within the range of one period Tm, in the case of Ca = Ca1 and Cb = Cb1.

In one embodiment described above, the position detection and the generation of the driving force are made by the same electrode. However, if a space margin exists, the similar electrostatic two-dimensional actuator can be accomplished by disposing separate electrodes for the position detection.

Another embodiment of the present invention will be explained with reference to FIG. 11. This embodiment has the construction wherein either one of the first and second rectangular electrode arrangements on the same electrode disposition surfaces of the movable element 1 and the stationary element 5 of the first embodiment. Particularly, the first rectangular electrode arrangement of the movable element 1 is disposed on the two electrode disposition surfaces of the movable element 1 on its center side and the second rectangular electrode arrangements are disposed on the outer two electrode disposition surfaces of the movable element 1. Similarly, the first rectangular electrode arrangement is disposed on the two electrode disposition surfaces of the stationary element 5 on its center side and the second rectangular electrode arrangement is disposed on the outer two electrode disposition surfaces.

Accordingly, the center of each of the propelling forces generated by the first electrode line and by the second electrode line has an equal distance to the right and left with respect to the centroid of the movable element 1. Accordingly, forces other than the propelling force generated by the first and second electrode lines, such as the moment of rotation does not occur in the movable element 1 and the movable element 1 can make stable two-dimensional movement.

Still another embodiment of the present invention will be explained with reference to FIG. 12. In this embodiment, the protuberance of the movable element 1 and the recess of the stationary element 5 are each one and the disposition surfaces of the mutually crossing first and second, rectangular electrode lines are disposed only on both side surfaces of one protuberance of the movable element 1 and on both side surfaces of one recess of the stationary element 5.

According to this embodiment, since the protuberance of the movable element 1 and the recess of the stationary element 5 are each only one, there can be obtained the effect that the production becomes simple.

Figure 13:
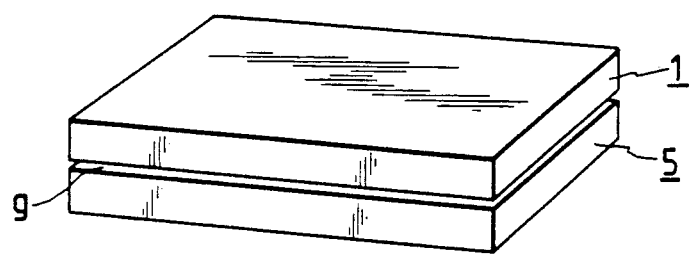

Still another embodiment of the present invention will be explained with reference to FIG. 13. The movable element 1 is supported by a support/guide mechanism, not shown in the drawing, in such a manner as to face the stationary element 5 with the gap g between them, and the mutually crossing first and second rectangular electrodes are arranged on the opposed surfaces of the stationary element 5 and movable element 1 in the same way as in the embodiment shown in FIG. 5. The movable element pattern (a) of FIG. 5 is linearly symmetric with respect to the center line j in the moving direction of the first electrode arrangement 31 and similarly symmetric linearly with respect to the center line h of the moving direction of the second electrode arrangement 32. Accordingly, since the centroid of the movable element 1 is in conformity with the center of generation of the propelling force by the first and second electrode lines, stable two-dimensional movement can be obtained without the generation of the moment of rotation, and the like.

Figure 14:
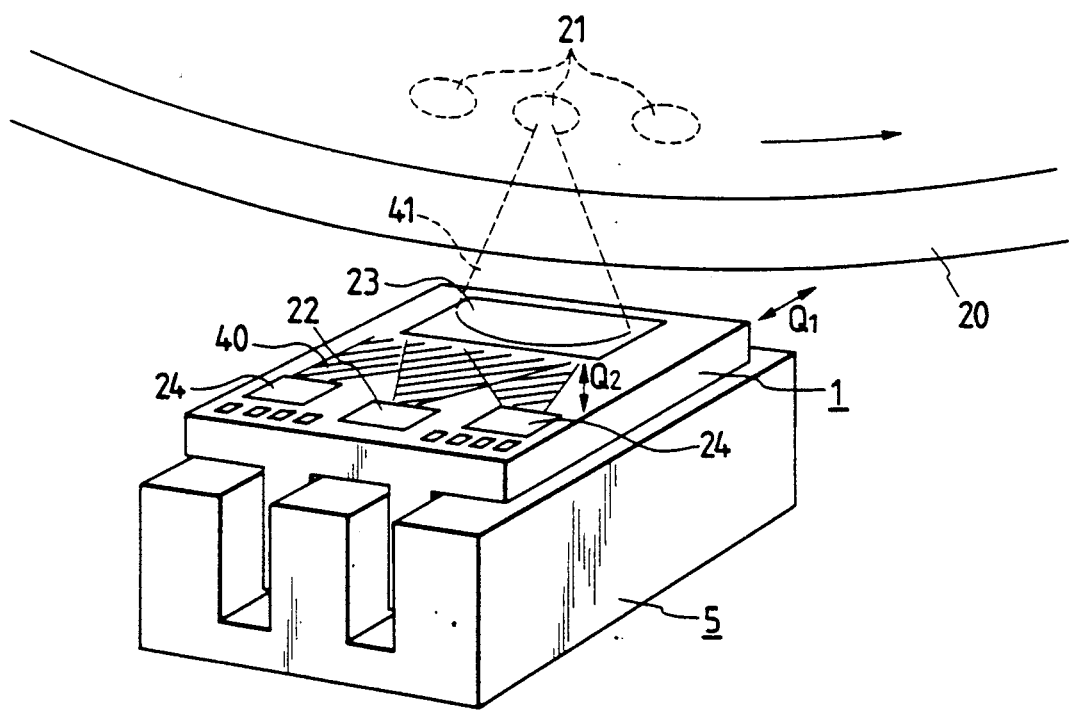
Figure 15:
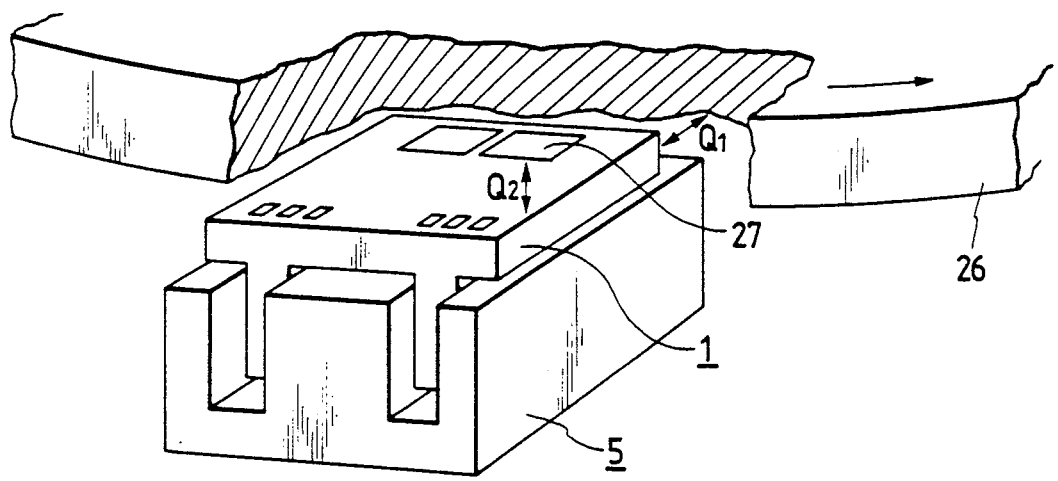
Figure 16:
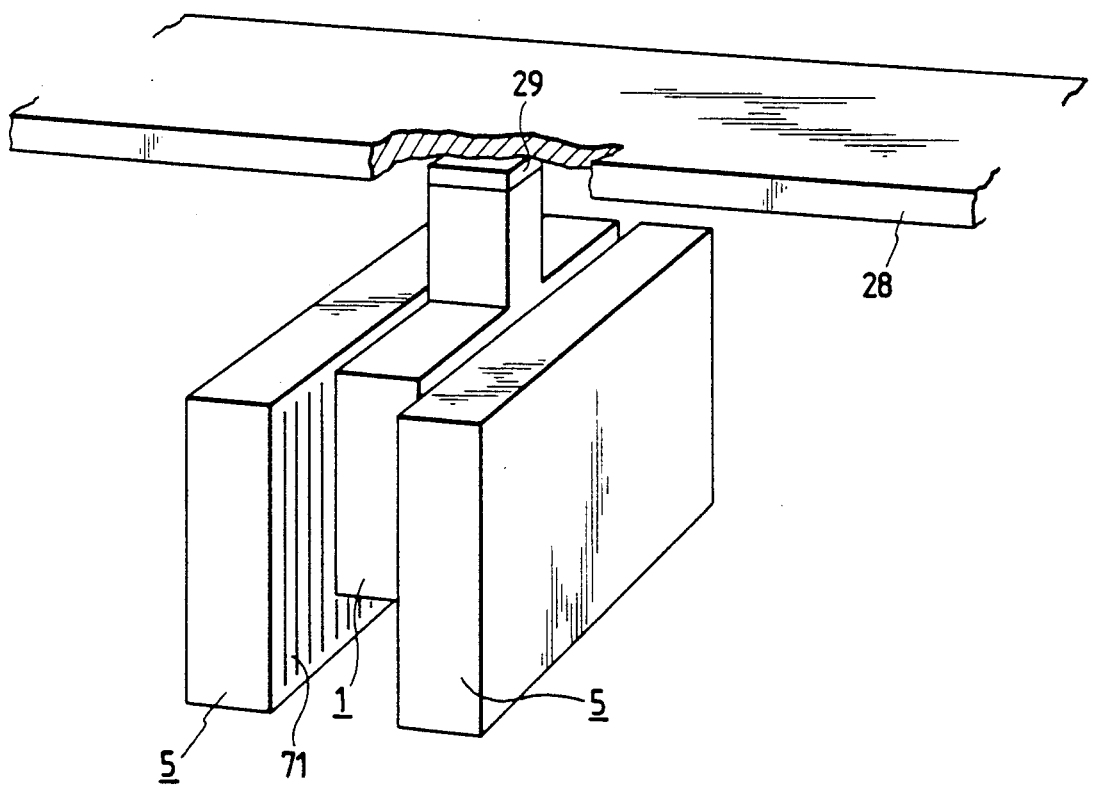

FIGS. 14 to 16 show three kinds of appearances of further embodiments of the present invention.

FIG. 14 shows the application of the electrostatic two-dimensional actuator of the first embodiment to an optical head the embodiment shown in FIG. 1.

The movable element 1 and the stationary element 5 are the electrostatic two-dimensional actuator shown in the embodiment of FIG. 1. An optical head is formed on the movable element 1 and read and write of information 21 on an optical disk 20 are effected optically. The optical head comprises a light emission member 22 such as a semiconductor laser, an optical modulation element 23 for changing the direction of the beam leaving the light emission member 20, focusing it on the track on the optical disk 20 and allotting the reflected beam from the information 21 on the optical disk 20 to a light reception member 23 and a waveguide 40 for passing the beam on the optical head.

According to this embodiment, an optical head which is compact and can make tracking and focusing at a high speed can be accomplished by letting the electrostatic two-dimensional actuator make the tracking operation (in the direction of arrow Q1) for following up the track on the optical disk 20 and the focusing operation (in the direction of arrow Q2) for focusing the information 21 on the optical disk 20. Definitely, an optical head of 2 mm square can be driven at 10 KHz or more at displacement of 0.1 μm.

The optical head can be formed as an integrated optical head formed on a silicon chip. On the other hand, the electrostatic actuator, too, can be formed in future on the silicon chip by use of the LSI fabrication technique. Therefore, the optical head and the movable element of the electrostatic two-dimensional actuator are suitable for integration, miniaturization is extremely easy and the effect when the optical head and the electrostatic two-dimensional actuator are combined is extremely great.

FIG. 15 shows the application of the embodiment of FIG. 1 to a magnetic head of a magnetic disk apparatus.

The movable element 1 and the stationary element 5 are the electrostatic two-dimensional actuator shown in the embodiment of FIG. 1. A magnetic head 27 is formed on the movable element 1. A magnetic head for a magnetic disk which is compact in size and can make tracking and spacing at a high speed can be accomplished by causing the electrostatic two-dimensional actuator to make the tracking operation (in the direction of arrow Q1 in the drawing) for the magnetic disk 26 to follow up the track and the spacing adjustment operation (in the direction of arrow Q2 in the drawing) for adjusting the spacing between the magnetic disk 26 and the magnetic head 27. Part of the magnetic disk 26 is shown cut in FIG. 15 in order to make the explanation easy. The cut surface is a hatching portion.

FIG. 16 shows the application of the electrostatic two-dimensional actuator of the present invention to a magnetic had of a magnetic tape. Reference numeral 1 represents the movable element and the stationary elements 5 are disposed so as to interpose the movable element. Only the first electrode lines 71, 31 (31 does not appear in the drawing) are disposed on the stationary elements 5 and the movable element 1. The magnetic head 29 is disposed on the movable element 1 and slides on the surface of the magnetic tape 28. A magnetic head for a magnetic tape which is compact and can, make high speed tracking can be accomplished by causing the electrostatic actuator to make the operation of the magnetic head which tracks the recording track on the magnetic tape 28.

In the embodiments described above, the combination of the material of the insulating material as the movable element or the stationary element with the material of the electrode may be Si and Al or the alumina ceramics insulating material and carbon steel (which is preferably a steel with 42% Ni having an equal thermal expansion coefficient with alumina ceramics). These combinations may be other combinations which match with the size of the movable element or the stationary element and with its intended object of use.

According to the present invention, the electrostatic propelling forces in the mutually crossing first and second directions can be controlled independently and moreover, since the propelling force is constant and smooth for a long distance without interruption depending at positions and does not impart disturbance such as the moment force of rotation to the movable element. Therefore, there can be obtained the effect that an electrostatic two-dimensional actuator moving two-dimensionally at a high speed over a wide range can be accomplished.

There is another effect that when this electrostatic two-dimensional actuator is provided, the operation such as tracking of the optical head or magnetic head can be sped up and the apparatus can be made further compact.

We claim:

1. An electrostatic two-dimensional actuator comprising:
 a stationary element having at least one surface, a plurality of first electrode lines disposed in parallel to each other on said at least one surface of said stationary element, each of said first electrode lines extending in a first direction, and a plurality of second electrode lines disposed in parallel to each other on said at least one surface of said stationary element, each of said second electrode lines extending in a second direction substantially perpendicular to the first direction;
 a movable element having at least one surface disposed in spaced juxtaposition with respect to said at least one surface of said stationary element and being movable with respect to said stationary element in both the first direction and the second direction, a plurality of third electrode lines disposed in parallel to each other on said at least one surface of said movable element, each of said third electrode lines extending in the first direction in opposite relation with respect to said first electrode lines of said stationary element and being arranged symmetrically with respect to a first center line bisecting said at least one surface of said movable element in the first direction and a second center line bisecting said at least one surface of said movable element in the second direction, and a plurality of fourth electrode lines disposed in parallel to each other on said at least one surface of said movable element, each of said fourth electrode lines extending in the second direction and being arranged symmetrically with respect to the first center line and the second center line; and means for applying voltage between at least one line from among said first electrode lines and at least one line from among said third electrode lines and for applying voltage between at least one line from among said second electrode lines and at least one line from among said fourth electrode lines in order to move said movable element in the first and second directions.

2. An electrostatic two-dimensional actuator comprising:

a stationary element having at least one surface, a plurality of first electrode lines disposed in parallel to each other on said at least one surface of said stationary element, each of said first electrode lines extending in a first direction, and a plurality of second electrode lines disposed in parallel to each other on said at least one surface of said stationary element, each of said second electrode lines extending in a second direction substantially perpendicular to the first direction;

a movable element having at least one surface disposed in spaced juxtaposition with respect to said at least one surface of said stationary element and being movable with respect to said stationary element in both the first direction and the second direction, a plurality of third electrode lines disposed in parallel to each other on said at least one surface of said movable element, each of said third electrode lines extending in the first direction in opposite relation with respect to said first electrode lines of said stationary element, and a plurality of fourth electrode lines disposed in parallel to each other on said at least one surface of said movable element, each of said fourth electrode lines extending in the second direction, and said first and second lines having a different length than said third and fourth electrode lines, respectively; and means for applying voltage between at least one line from among said first electrode lines and at least one line from among said third electrode lines and for applying voltage between at least one line from among said second electrode lines and at least one line from among said fourth electrode lines in order to move said movable element in the first and second directions.

3. An electrostatic two-dimensional actuator comprising:

a stationary element having two recesses, each of the two recesses having at least one surface, a plurality of first electrode lines disposed in parallel to each other on said at least one surface of each recess, each of said first electrode lines extending in a first direction, and a plurality of second electrode lines disposed in parallel to each other on said at least one surface of each recess, each of said second electrode lines extending in a second direction substantially perpendicular to the first direction;

a $\pi$-shaped movable element having two protuberances, each of the two protuberances having at least one surface disposed within a respective one of two recesses of said stationary element, said at least one surface of each protuberance being disposed in spaced juxtaposition with respect to said at least one surface of each recess and being movable with respect to said stationary element in both the first direction and the second direction, and said movable element comprising a plurality of third electrode lines disposed in parallel to each other on said at least one surface of each protuberance, said third electrode lines extending in the first direction in opposite relation with respect to said first lines of said stationary element, and a plurality of fourth electrode lines disposed in parallel to each other on said at least one surface of each protuberance, each of said fourth electrode lines extending in the second direction; and means for applying voltage between at least one line from among said first electrode lines and at least one line from among said third electrode lines and for applying voltage between at least one line from among said second electrode lines and at least one line from among said fourth electrode lines in order to move said movable element in the first and second directions.

4. An electrostatic two-dimensional actuator according to any one of claims 1-3, further comprising an electrostatic capacitance change detector for detecting a position of said movable element, wherein the detecting of the position of said movable element is carried out during a period in which said voltage applying means does not apply voltage between any of said electrode lines.

5. An electrostatic two-dimensional actuator comprising:

a stationary element having two recesses, each of the two recesses having at least one surface, a plurality of first electrode lines disposed in parallel to each other on said at least one surface of each recess, each of said first electrode lines extending in a first direction, and a plurality of second electrode lines disposed in parallel to each other on said at least one surface of each recess, each of said second electrode lines extending in a second direction substantially perpendicular to the first direction;

a $\pi$-shaped movable element having two protuberances, each of the two protuberances, each of the two protuberances having at least one surface disposed within a respective one of two recesses of said stationary element, said at least one surface of each protuberance being disposed in spaced juxtaposition with respect to said at least one surface of each recess and being movable with respect to said stationary element in both the first direction and the second direction, and said movable element comprising a plurality of third electrode lines disposed in parallel to each other on said at least one surface of each protuberance, said third electrode lines extending in the first direction in opposite relation with respect to said first lines of said stationary element, and a plurality of fourth electrode lines disposed in parallel to each other on said at least one surface of each protuberance, each of said fourth electrode lines extending in the second direction;

means for applying voltage between at least one line from among said first electrode lines and at least one line from among said third electrode lines and for applying voltage between at least one line from among said second electrode lines and at least one line from among said fourth electrode lines in order to move said movable element in the first and second directions, wherein both the voltage applied between at least one line from among said first electrode lines and at least one line from among said third electrode lines and the voltage applied lines and at least one line from among said second electrode lines and at least one line from among said fourth electrode lines is divided into at least three phases;

a power source voltage supply line for each of said phases; and a switching device for sequentially switching voltage applied to said voltage supply line in order to move said movable element, wherein the timing of the application of the voltage to said voltage supply line for each phase and the timing of cutting off of voltage to said voltage supply line for each phase are determined based on a change in electrostatic capacitance appearing at said voltage supply line for each phase.

6. An electrostatic two-dimensional actuator according to claim 5, wherein:

said first electrode lines are spaced from each other by a distance of $T_m$, said second electrode lines are spaced from each other by a distance of $T_m$, said third electrode lines are spaced from each other by a distance of $T_s$, and said fourth electrode lines are spaced from each other by a distance of $T_s$; and both the voltage between at least one line from among said first electorate lines and at least one line from among said third electrode lines and the voltage applied between at least one line from among said second electrode lines and at least one line from among said fourth electrode lines are divided into n phases such that the following relation is achieved:

$$T_s = (1 + 1/n) \times T_m.$$

7. An electrostatic two-dimensional actuator according to claim 3, wherein each protuberance of said movable element is clamped by one of said recesses of said stationary element.

8. An electrostatic two-dimensional actuator according to claim 3, wherein each recess of said stationary element functions as a guide mechanism for guiding movement of said movable element on a surface of said stationary element.

9. An electrostatic two-dimensional actuator according to any one of claims 1-3, wherein the centroid of said movable element is in conformity the center of a propelling force generated by said voltage applying means.

10. An electrostatic two-dimensional actuator according to any of claims 1-3, wherein both the voltage applied between at least one line from among said first electrode lines and at least one line from among said third electrode lines and the voltage applied between at least one line from among said second electrode lines and at least one line from among said fourth electrode lines are divided into at least three phases, and said actuator further comprises a power source voltage supply line for each of said phases and a switching device for sequentially switching voltage applied to said voltage supply line in order to move said movable element.

* * * * *